United States Patent [19]

Feldmann et al.

[11] 4,273,919
[45] Jun. 16, 1981

[54] METHOD FOR PRODUCING POLYLAUROLACTAM POWDER COMPOSITIONS FOR THE COATING OF METALS AT HIGH TEMPERATURES AND THEIR USE IN THE MANUFACTURE OF PIGMENTED POWDERS BY THE DRY-BLEND PROCESS

[75] Inventors: Rainer Feldmann; Karl-Adolf Müller; Karl-Heinz Hornung, all of Marl, Fed. Rep. of Germany

[73] Assignee: Chemische Werke Hüls Aktiengesellschaft, Marl, Fed. Rep. of Germany

[21] Appl. No.: 96,416

[22] Filed: Nov. 21, 1979

[30] Foreign Application Priority Data

Dec. 23, 1978 [DE] Fed. Rep. of Germany ....... 2855920

[51] Int. Cl.$^3$ ..................... C08G 69/14; C08G 69/16; C08G 69/46
[52] U.S. Cl. .................................. 528/313; 528/326; 528/480; 528/481; 528/496; 528/502; 260/37 N
[58] Field of Search ............... 528/313, 326, 480, 481, 528/496, 502

[56] References Cited

U.S. PATENT DOCUMENTS 3,564,599  2/1971  Schaaf et al. .................. 528/313
4,143,025  3/1979  Feldmann et al. .............. 260/33.4 R Primary Examiner—Harold D. Anderson
Attorney, Agent, or Firm—Gilbert L. Wells

[57] ABSTRACT

A process for preparing coating powders based on polylaurolactam for the vitrification coating process beginning with polylaurolactam granulates obtained by polymerizing laurolactam under internal pressure in the presence of 2 to 10% by wt. of water and 0.3 to 0.7% by wt. of phosphoric acid at temperatures between 265° and 300° C., in the absence of chain stabilizers, and which have a relative viscosity of between 1.50 and 1.80. After precooling to temperatures between −50° and 0° C., the granulates are ground and then graded. Extraction with methanol or ethanol is carried out prior to grinding or grading. Pigments are added to the monomerous laurolactam or to the polylaurolactam in the molten state prior to granulation. The powders are especially well suited to manufacture colored powders by the dry-blend process.

18 Claims, No Drawings

METHOD FOR PRODUCING POLYLAUROLACTAM POWDER COMPOSITIONS FOR THE COATING OF METALS AT HIGH TEMPERATURES AND THEIR USE IN THE MANUFACTURE OF PIGMENTED POWDERS BY THE DRY-BLEND PROCESS

CROSS REFERENCE TO RELATED APPLICATIONS

Applicants claim priority under 35 USC 119 for application No. P 28 55 920.8 filed Dec. 23, 1978 in the Patent Office of the Federal Republic of Germany.

The disclosure of assignee's copending application Ser. No. 924,355, filed July 13, 1978 now U.S. Pat. No. 4,195,162 is incorporated herein. Application Ser. No. 924,355 is a division of assignee's U.S. Pat. No. 4,143,025 and the divisional application defines the production of pigment-free polylaurolactam powders A.

BACKGROUND OF THE INVENTION

The field of the present invention is polyamide powders for the coating of metals.

The invention is particularly concerned with an improved process for preparing polylaurolactam coating compositions for coating metal objects at high temperatures where the polylaurolactam powder is obtained from polylaurolactam granulates which granulates in turn are obtained by polymerizing laurolactam in the presence of 2 to 10% by wt. of water, 0.3 to 0.7% by wt. of phosphoric acid and at temperatures between 265° and 300° C. in the absence of any chain stabilizers and under internal pressure of about 14 to 25 bars.

The state of the prior art of producing polyamide powders may be ascertained by reference to U.S. Pat. Nos. 2,698,966; 2,742,440; 2,975,128; 2,993,879; 3,203,822; 3,299,009; 3,321,447; 3,476,711; 3,564,599; 3,900,607; 3,927,141; 3,966,838 and 4,143,025 and the Kirk-Othmer "Encyclopedia of Chemical Technology" 2nd Ed., Vol. 16 (1968), under the section "Polyamide (Plastics)", pages 88–105, particularly page 92-polylauryllactam (nylon-12), and polyundecanamide (nylon-11), page 101 Solution Processes, and Powder Processing, pages 101–102, the disclosures of which are incorporated herein.

U.S. Pat. No. 2,698,966 discloses physical mixtures of different types of nylon powders produced by dissolving the nylon in organic solvents and precipitating the powdered particles. In Example 14 of U.S. Pat. No. 2,742,440, the solution of epsilon caprolactam in alcohol-water solution and its precipitation as a powder is disclosed. The dispersion of Teflon powder in a solution of epsilon caprolactam and the coprecipitation of the powders is disclosed in U.S. Pat. No. 2,975,128.

The flame spraying and fluidized bed coating of nylon on a metal base is disclosed in U.S. Pat. No. 3,203,822. U.S. Pat. No. 3,410,832 discloses the preparation of polymers and copolymers of lauryllactam (laurolactam).

It is known to use polyamide based powder coating compositions in the preparation of coatings similar to lacquer on metals. The coatings are applied by a vitrification coating process. The term includes the fluidized bed coating method, the flame spraying method and the electrostatic coating method.

An especially advantageous process is described in U.S. Pat. No. 4,143,025. This procedure however, can stand improvement. The procedure of U.S. Pat. No. 4,143,025 requires observing two different operational sequences for (A) non-pigmented and (B) pigmented coating powders. Thus, the non-pigmented (A) so-called natural powders which are obtained by grinding, must be post-condensed in the solid state, whereby the space-time yield is lowered and higher energy consumption is incurred.

The pigmented powders (B) on the other hand, require a wholly different preparation, namely, precipitation from solvents. Accordingly, the manufacture of the different powders requires two different production lines, whereby a substantially higher cost is experienced, and this also entails the limitation of dealing with solvents.

Lastly, the powders obtained by the described state of the aret are not yet sufficiently satisfactory as regards quality. Both the so-called natural powders and the pigmented powders evidence a strong drop in elasticity, especially following the so-called "dry-blend pigmentation" and when substantially thick metal parts are coated. Furthermore, the powders evidence low yellowing resistance (overbaking stability). This drawback shows itself in that differences in color occur when metal parts of different thicknesses are coated. This varyingly pronounced yellowing is found both in the natural powders and in those obtained from "dry-blend pigmentation".

By "dry-blend" process is meant the application of shear and heat to a blend of polymer plus additives, resulting in an absorption of the additives into the softened polymer. Especially high speed mixers are used. By the process a dry free-flowing blend (powder) is obtained. No solvents are used. (Developments in PVC Technology, Chapter 6, pp. 90 to 106).

SUMMARY OF THE INVENTION

Having in mind the limitations of the prior art, it is an object of the present invention to discover a simplified preparation process suited both for the manufacture of pigmented and of pigment-free powders.

Other objects of the present invention are powders with decreased yellowing and improved elasticity while maintaining the good properties already obtained in U.S. Pat. No. 4,143,025.

These objects are achieved in the present invention by:

(a) selecting polylaurolactam granulates having a relative viscosity between about 1.50 and 1.80 as measured in a 0.5% meta-cresol solution at 25° C.;

(b) precooling the granulates in liquid nitrogen;

(c) grinding the cooled granulates at temperatures between about −100° C. and 0° C., preferably between −50° C. and 0° C.;

(d) grading the powders by sifting and screening to a grain distribution of 99% by weight greater than 40 microns but less than 250 microns;

(e) extracting the powders with methanol or ethanol before grinding or before or after grading at about 25° to 100° C.; and (f) in the case of pigmented powders, the pigments are added to the monomerous polylaurolactam before or during polymerization or to the polylaurolactam after polymerization but before granulation where the polylaurolactam is in the molten state.

DESCRIPTION OF THE PREFERRED EMBODIMENTS

The polylaurolactam granulates used are obtained by polymerizing laurolactam in the presence of about 2 to 20% by wt. water and about 0.3 to 0.7% by wt. of phosphoric acid in the absence of any chain stabilizers at temperatures between about 265° and 300° C. under internal pressure of about 14 to 25 bars.

The granulates used may range over a fairly wide viscosity, namely a relative viscosity from 1.50 to 1.80.

Compared to method A of U.S. Pat. No. 4,143,025, there is the further advantage that the subsequent condensation may be eliminated. With respect to method B of U.S. Pat. No. 4,143,025, there is the advantage that the precipitation method can be eliminated and that the pigments need not be added in a special process stage.

Again no specific sequence is mandatory as regards the intermediate extraction stage. Suitable pigments for instance are titanium dioxide, barium sulfate, iron oxide, cadmium pigments or lampblack. These pigments are added to the molten polyamide in the conventional amounts from 1 to 20, preferably from 2 to 10% by wt., before or during polymerization, or after polymerization and before granulation. Especially titanium dioxide is used by this method as a white pigment to obtain a white colored polylaurolactam. Particularly titanium dioxide is added after polymerization to the molten polylaurolactam before granulation, i.e. in an extruder. To obtain other colored polylaurolactam powders, the pigments especially are added to the so-called natural powders or to the white powders in the "dry blend" process.

The pigmented or unpigmented granulates are ground in an inert gas atmosphere, preferably following precooling in liquid nitrogen, at air temperatures from −100° C. to 0° C., preferably from −70° to −20° C., by means of impact comminution. After grinding, the coarse particles greater than 250 microns are screened off for instance by an air-jet screen. The interfering proportion of particles less than 40 microns for instance is eliminated by gravity sifters. The grain size distribution therefore, will be but greater than 40 microns and at least 99% less than 250 microns, in other words, the proportion of coarse and of fine particles shall be less than 1% each.

Fluidized bed powders generally have a grain size distribution within this range from 30 to 300 microns, especially from 60 to 250 microns, and electrostatic or flamespray powders from 0 to 100, especially from 0 to 80 microns. Smoking during the coating process is prevented by extraction with methanol or ethanol at 25° to 100° C., especially at the reflux temperature of the alcohol. At temperatures above the boiling point of the alcohol, operation will have to be correspondingly under pressure. The extraction therefore can take place both in the granulate stage and by extracting the powders, where the latter can be extracted both before and after grading. Following extraction, the granulates or powders are conventionally dried, for instance by being treated in an agitator or tumbling drier at temperatures between 40° and 100° C. in an inert gas atmosphere or possibly under application of vacuum. Aging, heat or light stabilizers, which ordinarily are present in amounts of 0.1 to 2% by wt., such as sterically inhibited phenols, triazines, phosphites, hypophosphorous acid, hypophosphites, can be added during or after polymerization or also for instance, during the extraction or grinding process.

This simplified procedure allows making coatings, especially by the fluidized bed metod, without interfering smoke, with good running properties, good edge coating, with adhesion and with excellent resistance to aqueous alkaline solutions. Furthermore, the coatings remain elastic even when thick metal parts are covered and are highly resistant to yellowing. "Dry-blend" pigmented powders offer substantially improved mechanical properties.

EXAMPLE 1

10 kg of laurolactam together with 800 g of water and 60 g of 85% phosphoric acid are heated for 7 hours to 280° C. in an autoclave and a pressure of 19 bars results. This is followed by depressurizing and the mixture is removed when a relative viscosity of 1.60 is reached and then is granulated. The polymer particles are boiled with reflux with twice the amount in weight of ethanol for 5 hours. Thereupon 100 g of 4-hydroxy-3,5-di-tert.-butyl-phenylpropionic acid dissolved in 1 liter of ethanol are stirred in. After distilling off the solvent and after drying, the granulate is precooled with liquid nitrogen (−190° C.) and ground at −40° C. The proportion of powder greater than 250 microns is screened off by means of an air jet screen and the proportion of material less than 40 microns is separated by a wind sifter.

The following qualities are observed when coating by the fluidized bed method: no smoke when coating, smooth surface, good running at crossed-grid sites, very good coating of sharp edges, Erichsen dent >10 mm, impact-dent >1,800 mm/7.6 kg, resistance to 1% boiling liquor of a coarse detergent >2,000 hours, yellowing of the coating of a metal part at 260° C. and of dimensions 14×25×80 mm: not ascertainable.

A grey powder is obtained by admixing 2% of titanium dioxide pigment and 0.1% of lampblack to the sifted natural powder in the "dry-blend" process. When coating a metal plate 1 mm thick, a coating is obtained which when suddenly bent 180° will not tear.

EXAMPLE 2

The procedure is the same as in Example 1 except that 600 g of titanium dioxide are added prior to polycondensation.

The coating with the powder from the fluidized bed results in the same properties as for the natural powder in Example 1. In this case, too, no yellowing is found when a metal part is coated at 260° C. with a size of 14×25×80 mm.

A yellow powder is obtained by admixing 2% of cadmium yellow pigment to the sifted white powder in the "dry-blend" process. When a metal plate 1 mm thick is coated, a coating is obtained which for sudden bending by 180° C. does not tear.

COMPARISON EXAMPLE 1 (U.S. Pat. No. 4,143,025, Method A)

10 g of laurolactam together with 800 g of water and 60 g of 85% phosphoric acid are heated for 7 hours to 280° C. in an autoclave, a pressure of about 19 bars resulting. This is followed by cooling to 240° to 230° C. (pressure is about 13 to 14 bars) and the bottom valve is opened. The polymer is guided by a water jet incident on it at an angle of about 90° into a water bath and following cooling is comminuted in a cutting mill, i.e., granulated. The polylaurolactam is dried at a temperature of 60° to 80° C. and a pressure of about 30 mbars. The relative viscosity of the solution is 1.39.

The polymer particles are boiled under reflux with a two fold weight of methanol for 2 hours. The methanol is removed and replaced by the same amount of fresh methanol. Again boiling under reflux takes place for 2 hours, the methanol is removed, and drying takes place at 30 mbar and 80° C. The polylaurolactam is ground in an impact disk pulverizer at a circulating gas temperature of 20° C. The mill is kept at the temperature of 20° C. by partial addition of liquid nitrogen. Thereupon the powder is after-condensed for 5 hours at a temperature of 145° C., in a drying oven and in a thin layer, by nitrogen being made to pass over it. The viscosity of solution of the powder than has a relative viscosity of 1.59.

The fluidized bed coating offers the following properties: no smoke during coating, smooth coating surface, good to very good coating of sharp edges, Erichsen dent >10 mm, impact of >1,800 mm/7.6 kg, resistance to 1% boiling liquor of a hot detergent >2,000 hours, yellowing when coating a metal part at 260° C. with dimensions 14×25×80 mm: very pronounced.

A grey powder is made by admixing 2% of titanium dioxide pigment and 0.1% of lampblack to the natural powder in the dry-blend process to natural powder. When coating a metal plate 1 mm thick, a coat is obtained which tears when suddenly bent by 180°. When coating the metal part at 260° C., the dimensions also being 14×25×80 mm, a highly yellowed coating is also obtained.

COMPARISON EXAMPLE 2 (U.S. Pat. No. 4,143,025 Method B)

Polylaurolactam produced per Comparison Example 1 and with a relative viscosity of solution of 1.60, in granulated and extracted form, was used.

100 g of this polylaurolactam, 200 ml of ethanol and 7 g titanium dioxide pigment were put into a glass autoclave. This is followed by heating for 2 hours to 140° C., a pressure of about 7 bars resulting. Then cooling follows at a rate of 1° C./minute and a stirring rate of about 5 rpm. The powder is dried in a drying oven at 0.7 mbar and 80° C. When coating metal parts, the same assessment is obtained for white pigmented powders in all points as for the natural powders of Comparison Example 1. Here too strong yellowing is observed when a metal part is coated at 260° C., the dimensions being 14×25×80 mm.

A yellow powder is made by admixing 2% of cadmium yellow pigment to the white powder in the dry-blend process. When a metal part 1 mm thick is coated, a coating is obtained when suddenly bent by 180° does tear.

The table below shows the results of the Examples and Comparison Examples.

TABLE

| | Edge Coating | Lye Test (1000 h) | Impact Dent mm/ 7.6 kg | Yel- low- ing | Bending Test Before After Pigmentation | |
|---|---|---|---|---|---|---|
| Example 1 | very good | 2 | 1800 | no | + | + |
| Example 2 | very good | 2 | 1800 | no | + | + |
| Comparison Example 1 | very good | 2 | 1800 | yes | + | − |
| Comparison Example 2 | very good | 2 | 1800 | yes | + | − |

We claim:
1. A method of producing polylaurolactam powders comprising:
   (a) polymerizing laurolactam in the presence of about 2 to 10 percent by weight of water, based on said laurolactam, about 0.3 to 0.7 percent by weight of phosphoric acid, based on said laurolactam and at a temperature of about 265° to 300° C., in the absence of chain stabilizers under an internal pressure of about 14 to 25 bars to a polylaurolactam having a relative viscosity of about 1.50 to 1.80 measured in a 0.5 percent meta-cresol solution at 25° C.;
   (b) granulating said polylaurolactam of (a);
   (c) extracting said granulated polylaurolactam with ethanol or methanol at a temperature of about 25° to 100° C.;
   (d) reducing to powdered form said extracted polylaurolactam of (c) at a temperature of about −100° to 0° C.; and
   (e) grading and separating said powdered polylaurolactam into a grain size distribution of at least 99% by weight greater than 40 microns, but less than 250 microns.

2. A method of producing polylaurolactam powders comprising:
   (a) polymerizing laurolactam in the presence of about 2 to 10 percent by weight of water, based on said laurolactam, about 0.3 to 0.7 percent by weight of phosphoric acid, based on said laurolactam and at a temperature of about 265° to 300° C., in the absence of chain stabilizers under an internal pressure of about 14 to 25 bars to a polylaurolactam having a relative viscosity of about 1.50 to 1.80 measured in a 0.5 percent meta-cresol solution at 25° C.;
   (b) granulating said polylaurolactam of (a);
   (c) reducing to powdered form said granulated polylaurolactam of (b) at a temperature of about −100° to 0° C.;
   (d) extracting said powdered polylaurolactam with ethanol or methanol at a temperature of about 25° to 100° C.; and
   (e) grading and separating said extracted powdered polylaurolactam into a grain size distribution of at least 99% by weight greater than 40 microns but less than 250 microns.

3. A method of producing polylaurolactam powders comprising:
   (a) polymerizing laurolactam in the presence of about 2 to 10 percent by weight of water, based on said laurolactam, about 0.3 to 0.7 percent by weight of phosphoric acid, based on said laurolactam and at a temperature of about 265° to 300° C., in the absence of chain stabilizers under an internal pressure of about 14 to 25 bars to a polylaurolactam having a relative viscosity of about 1.50 to 1.80 measured in a 0.5 percent meta-cresol solution at 25° C.;
   (b) granulating said polylaurolactam of (a);

(c) reducing to powdered form said granulated polylaurolactam of (b) at a temperature of about −100° to 0° C.;

(d) grading said powdered polylaurolactam into a grain size distribution of at least 99% by weight greater than 40 microns but less than 250 microns; and (e) extracting and separating said graded polylaurolactam with ethanol or methanol at a temperature of about 25° to 100° C.

4. The method of claim 1, wherein pigments are added between step (a) and step (b).

5. The method of claim 2, wherein pigments are added between step (a) and step (b).

6. The method of claim 3, wherein pigments are added between step (a) and step (b).

7. The method of claim 1, wherein pigments are added in step (a).

8. The method of claim 2, wherein pigments are added in step (a).

9. The method of claim 3, wherein pigments are added in step (a).

10. The method of claim 1, wherein colored pigments are added by the dry blend process after step (e).

11. The method of claim 2, wherein colored pigments are added by the dry blend process after step (e).

12. The method of claim 3, wherein colored pigments are added by the dry blend process after step (e).

13. The method of claim 4, wherein colored pigments are added by the dry blend process after step (e).

14. The method of claim 5, wherein colored pigments are added by the dry blend process after step (e).

15. The method of claim 6, wherein colored pigments are added by the dry blend process after step (e).

16. The method of claim 7, wherein colored pigments are added by the dry blend process after step (e).

17. The method of claim 8, wherein colored pigments are added by the dry blend process after step (e).

18. The method of claim 9, wherein colored pigments are added by the dry blend process after step (e).

* * * * *